US009322506B2

(12) United States Patent
Ervin et al.

(10) Patent No.: US 9,322,506 B2
(45) Date of Patent: Apr. 26, 2016

(54) COMPLIANT MOTION DISTRIBUTION SYSTEM

(75) Inventors: Gregory F. Ervin, Garden City, MI (US); Dragan Maric, Ann Arbor, MI (US); James D. Ervin, Novi, MI (US)

(73) Assignee: FlexSys, Inc., Ann Arbor, MI (US)

( * ) Notice: Subject to any disclaimer, the term of this patent is extended or adjusted under 35 U.S.C. 154(b) by 944 days.

(21) Appl. No.: 12/932,667

(22) Filed: Mar. 2, 2011

(65) Prior Publication Data
US 2011/0253957 A1 Oct. 20, 2011

Related U.S. Application Data

(60) Provisional application No. 61/339,366, filed on Mar. 2, 2010.

(51) Int. Cl.
*F16M 11/38* (2006.01)
*D06C 3/08* (2006.01)
*D06F 59/08* (2006.01)

(52) U.S. Cl.
CPC .................. *F16M 11/38* (2013.01); *D06C 3/08* (2013.01); *D06F 59/08* (2013.01); *F16M 2200/061* (2013.01)

(58) Field of Classification Search
CPC ............ D06F 59/08; D06C 3/08; D06C 3/00; D06C 3/02; D06C 3/04; D06C 3/10; D06C 2700/02; D05C 9/10; D05C 9/12; D05C 9/14; B44D 3/185; D05B 39/00; D05B 39/005; F16M 11/38; F16M 2200/06; F16M 2200/061; F16M 2200/063

USPC .............................. 38/102.4–102.91; 254/199
See application file for complete search history.

(56) References Cited

U.S. PATENT DOCUMENTS

| 1,039,053 | A | * | 9/1912 | Harper | 38/102.5 |
|---|---|---|---|---|---|
| 1,159,270 | A | * | 11/1915 | Pugsley | 223/91 |
| 2,400,787 | A | * | 5/1946 | Taylor | 38/102.5 |
| 2,752,630 | A | * | 7/1956 | Taylor | 38/102.4 |
| 2,759,217 | A | * | 8/1956 | Peterson | 38/102.4 |
| 3,370,364 | A | * | 2/1968 | Cumbers | 38/102.4 |
| 3,863,368 | A | * | 2/1975 | Vasilantone | 38/102.5 |
| 6,138,592 | A | * | 10/2000 | Seneff | 112/103 |
| 2009/0078920 | A1 | * | 3/2009 | Gogoussis | 254/122 |

* cited by examiner

*Primary Examiner* — Ismael Izaguirre
(74) *Attorney, Agent, or Firm* — Rohm & Monsanto, PLC

(57) ABSTRACT

A force distribution arrangement is configured as an array of compliant building blocks, each having a plurality of leg elements having respective leg thickness distribution and leg lengths. The plurality of leg elements are, in some embodiments, of uniform thickness and uniform leg length. The legs are joined to one another at corresponding compliant nodes, and are integrally formed. The array is constrained at a first end thereof, and optionally at a second end thereof. A membrane is arranged to overlie the array, and a control point is affixed to the array and optionally to the membrane that overlies the array. The membrane is formed of a compliant material or fabric. A further array is arranged in some applications at a predetermined orientation with respect to the first array. The arrays have respective actuation force response characteristics to achieve contour upon the application of actuation forces.

17 Claims, 5 Drawing Sheets

US 9,322,506 B2

COMPLIANT MOTION DISTRIBUTION SYSTEM

RELATIONSHIP TO OTHER APPLICATION

This application claims the benefit of the filing date of U.S. Provisional Patent Application Ser. No. 61/339,366, filed Mar. 2, 2010, the disclosure of which is incorporated herein by reference.

BACKGROUND OF THE INVENTION

1. Field of the Invention

This invention relates generally to systems for achieving conversion of motion, and more particularly, to a system for achieving motion of one or more control points substantially along respectively associated paths of motion in response to the application of a remote actuation force.

2. Description of the Related Art

There are numerous instances where it is desired to stretch a membrane uniformly such that the tensile force along the membrane is evenly distributed in response to the application of an actuation force. In other instances, it is desired that the tensile force be distributed in accordance with a predetermined tension gradient.

It is, therefore, an object of this invention to provide an arrangement that provides an output motion of predetermined force and direction in response to an actuation force.

It is another object of this invention to provide an arrangement that facilitates the stretching of an elastic membrane.

It is still another object of this invention to provide an arrangement that provides an output contour to a compliant web material, the contour being of predetermined force and direction in response to an actuation force.

SUMMARY OF THE INVENTION

The foregoing and other objects are achieved by this invention which provides a force distribution arrangement. In accordance with the invention, there is provided a compliant building block having a plurality of leg elements having respective leg thickness distribution and leg length, and a corresponding plurality of compliant nodes where the leg elements are joined to one another.

In one embodiment of the invention, the leg elements and the compliant nodes are integrally formed.

In a further embodiment, there are provided a plurality of compliant building blocks coupled to each other to form an array. In an advantageous embodiment the array of compliant building blocks is integrally formed. In the practice of this embodiment, the array is constrained at a first end thereof. Additionally, the array is constrained at a second end thereof.

In a highly advantageous and practicable embodiment of the invention there is provided a membrane arranged to overlie the array. A control point is, in some embodiments, affixed to the array, and may be coupled to a control point that is also coupled to the membrane that overlies the array.

The membrane is formed, in some embodiments, of a compliant material. Additionally, the membrane can be a compliant fabric.

In a still further embodiment, there is provided a further array that is arranged at a predetermined orientation with respect to the first array. The array and the further array have respective actuation force response characteristics to achieve an advantageous contour upon the application of one or more actuation forces.

The plurality of leg elements are, in some embodiments, characterized with a uniform thickness. Additionally, they may be characterized with uniform leg length.

BRIEF DESCRIPTION OF THE DRAWING

Comprehension of the invention is facilitated by reading the following detailed description, in conjunction with the annexed drawing, in which.

DETAILED DESCRIPTION

Figure 1:
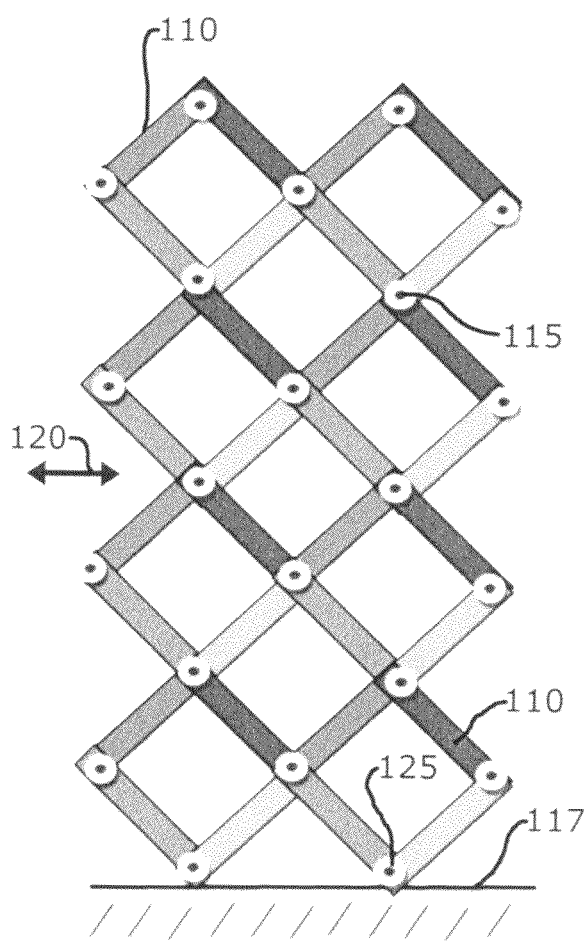
FIG. 1 is a simplified schematic representation of a motion distribution morphing drive arrangement that is useful in describing the fundamental operating principles of the invention.

FIG. 1 is a simplified schematic representation of a motion distribution morphing drive arrangement 100 that is useful in describing the fundamental operating principles of the invention. As shown in this figure, motion distribution morphing drive arrangement 100 is formed of rigid links 110 that in this specific illustrative embodiment of the invention are coupled to one another by pivotal joints 115. Motion is constrained in this embodiment by grounding constraint 117.

Figure 2:
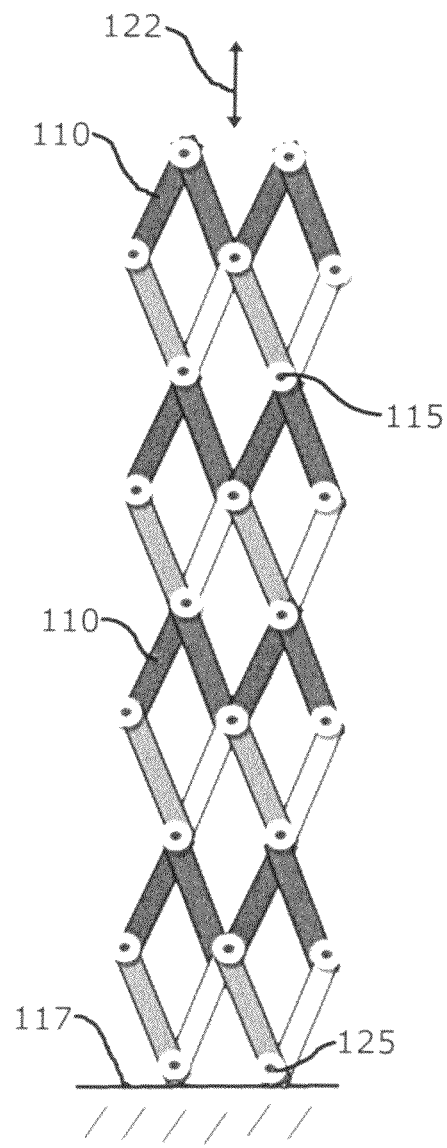
FIG. 2 is a simplified schematic representation of the motion distribution arrangement of FIG. 1 following application of an actuation force to achieve uniform elongation functionality.

FIG. 2 is a simplified schematic representation of motion distribution morphing drive arrangement 100 shown in FIG. 1 following actuation to achieve uniform elongation functionality. Elements of structure that have previously been discussed are similarly designated. Referring for the moment to FIG. 1, actuation is achieved in this embodiment of the invention by the application of an actuation force in the directions of arrow 120. such an actuation force results in motion of pivotal joints 115 in the direction of arrow 122 in FIG. 2. However, lowermost pivotal joints 125 remain in this embodiment in fixed distance with respect to grounding constraint 117.

Figure 3:
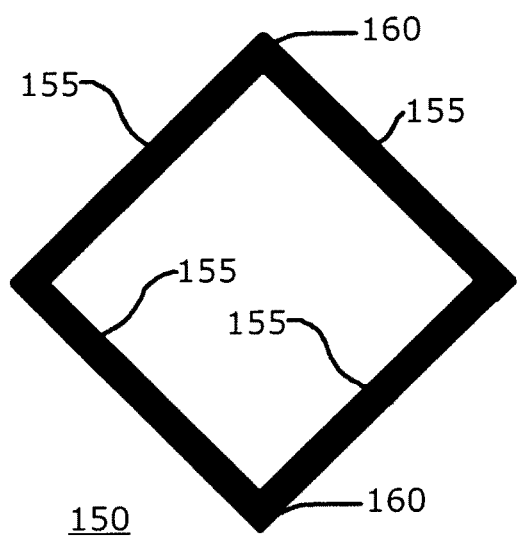
FIG. 3 is a simplified schematic representation of a four resilient element, four node, basic building block useful in a specific illustrative embodiment of the invention.

FIG. 3 is a simplified schematic representation of a four resilient element, four node, basic building block 150 that is useful in a specific illustrative embodiment of the invention. As shown in this figure, basic building block 150 is comprised of four resilient leg elements 155 that are coupled to each other at respective compliant joints 160. In this specific illustrative embodiment of the invention, resilient leg elements 155 and compliant joints 160 are integrally formed, as will be illustrated below in relation to FIG. 7. Referring once again to FIG. 3, basic building block 150 is shown in a neutral condition, i.e., without any actuation force being applied.

Figure 4:
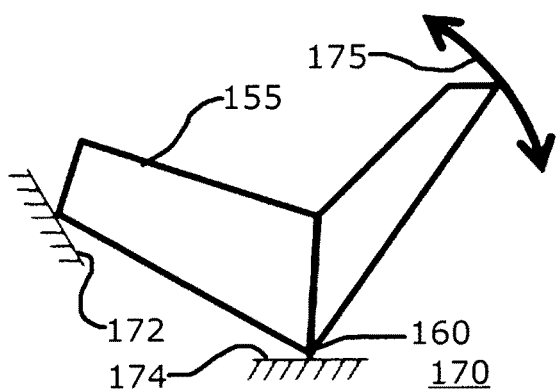
FIG. 4 is a simplified schematic representation of a specific illustrative embodiment of a motion distribution arrangement that utilizes a plurality of four resilient element, four node, basic building blocks of the type shown in FIG. 3 to achieve distributed motion relative to a plurality of constraints.

FIG. 4 is a simplified schematic representation of a specific illustrative embodiment of a motion distribution arrangement 170 that utilizes a plurality of basic building block 150 of the type shown in FIG. 3 to achieve distributed motion relative to a plurality of constraints 172 and 174. The use of plural constraints results in non-linear and non-uniform motion, as represented in this embodiment by curved arrow 175.

Figure 5:
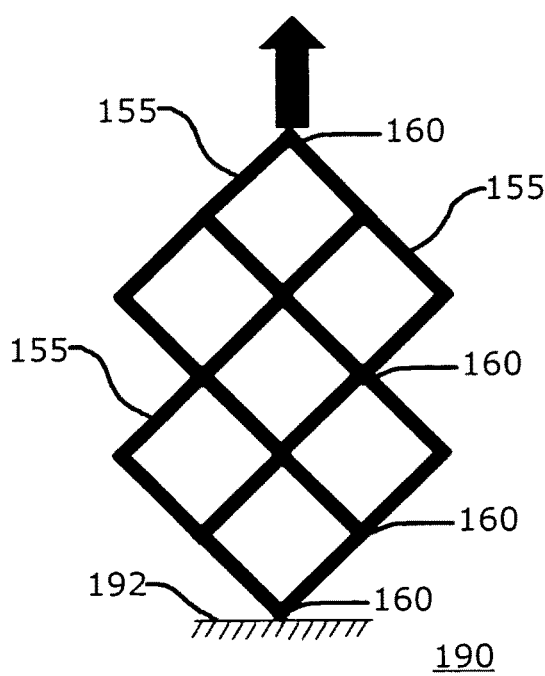
FIG. 5 is a simplified schematic representation of a specific illustrative embodiment of a motion distribution arrangement that utilizes a plurality of four resilient element, four node, basic building blocks shown of the type shown in FIG. 3 to achieve non-uniform distribution of motion relative to a single constraint.

FIG. 5 is a simplified schematic representation of a specific illustrative embodiment of a motion distribution arrangement that utilizes a plurality of four resilient element, four node, basic building blocks shown of the type shown in FIG. 3 to achieve non-uniform distribution of motion relative to a single constraint 192.

Figure 6:
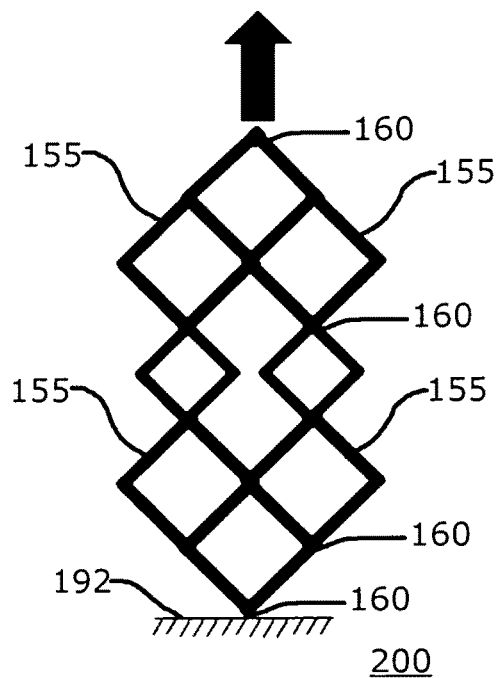
FIG. 6 is a simplified schematic representation of a specific illustrative embodiment of a motion distribution arrangement that utilizes a plurality of four resilient element, four node, basic building blocks shown of the type shown in FIG. 3 to achieve non-uniform distribution of motion relative to a single constraint.

FIG. 6 is a simplified schematic representation of a specific illustrative embodiment of a motion distribution arrangement that utilizes a plurality of four resilient element, four node, basic building blocks shown of the type shown in FIG. 3 to achieve non-uniform distribution of motion relative to a single constraint. Elements of structure that have previously been discussed are similarly designated.

Figure 7:
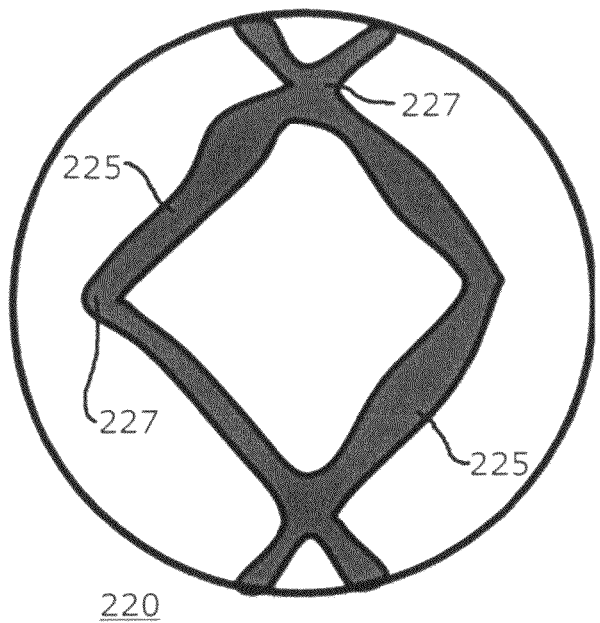
FIG. 7 is a simplified schematic representation of a specific illustrative embodiment of the motion distribution arrangement that employs variations in thicknesses and contours of the legs to achieve determined stiffness and force gradient characteristics.

FIG. 7 is a simplified schematic representation of a specific illustrative embodiment of the motion distribution arrangement wherein a resilient base member 220 employs variations in thicknesses and contours of the legs to achieve determined stiffness and force gradient characteristics. As shown in this figure, resilient base member 220 has resilient legs 225 that are interconnected at compliant nodes 227. The resilient legs 225 are seen to have variable thickness over their respective lengths. Such variation in thickness results in a customizable motion response (not shown). In addition, resilient legs 225 have, in some embodiments, lengths that differ from one another to achieve the customizable motion response.

Figure 8:
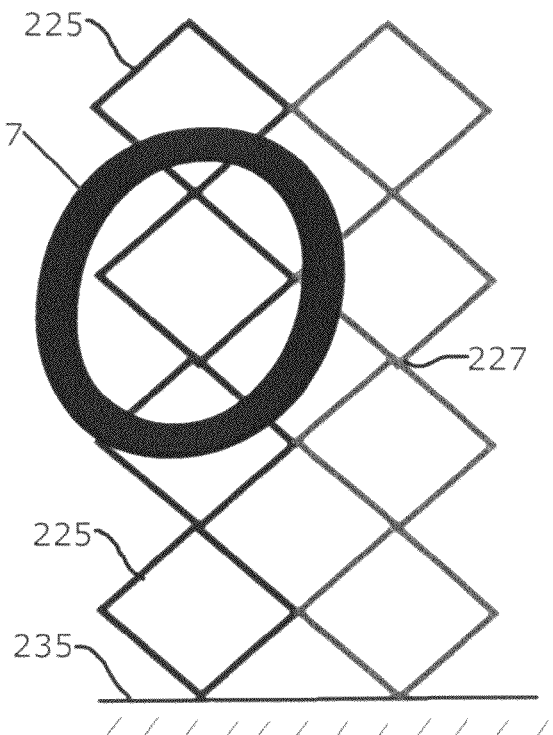
FIG. 8 is a simplified schematic representation of a specific illustrative embodiment of a motion distribution arrangement that utilizes a plurality of four-element, four node, basic building blocks shown of the type shown in FIG. 7 to achieve uniformly distributed motion relative to a single constraint.

FIG. 8 is a simplified schematic representation of a specific illustrative embodiment of a motion distribution arrangement 230 that utilizes a plurality of four-element, four node, basic building blocks in the form of resilient base member 220 shown in FIG. 7 to achieve uniformly distributed motion relative to a single constraint 235. Elements of structure that have previously been discussed are similarly designated.

Figure 9:
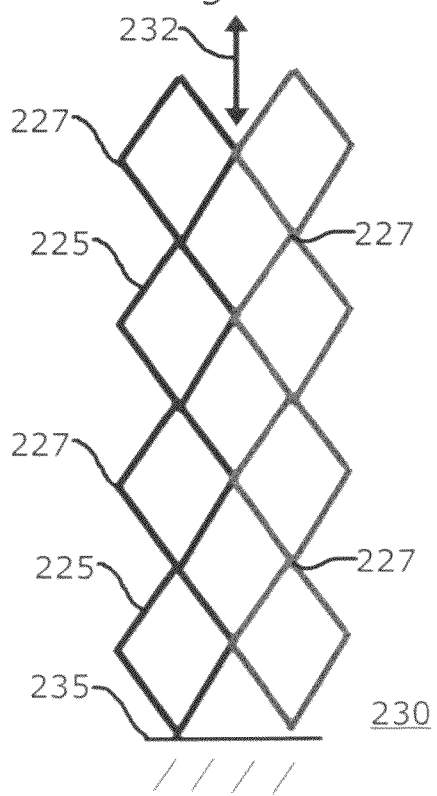
FIG. 9 is a simplified schematic representation of the embodiment of FIG. 8 following actuation to achieve uniform elongation functionality.

FIG. 9 is a simplified schematic representation of the embodiment of FIG. 8 following actuation to achieve uniform elongation functionality along the direction illustrated by arrow 232. Elements of structure that have previously been discussed are similarly designated. Although arrow 232 is shown in this specific illustrative embodiment of the invention to be straight, any form of curved motion can be achieved by selection of thicknesses and variations of the thicknesses of resilient legs 225.

Figure 10:
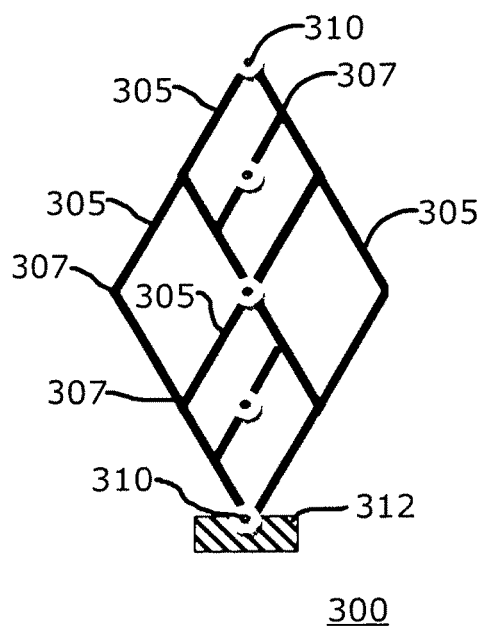
FIG. 10 is a simplified schematic representation of a parallel linkage embodiment of the invention.

FIG. 10 is a simplified schematic representation of a parallel linkage embodiment of the invention in the form of a parallel linkage arrangement 300 that has, in this specific illustrative embodiment of the invention, plural compliant legs 305 that are coupled to one another at compliant nodes 307. In addition, selected ones of the legs and/or nodes are, in this embodiment, provided with couplers 310 affixed thereto for coupling to a load (not shown in this figure). In this embodiment of the invention, parallel linkage arrangement 330 is coupled to a single constraint 312.

Figure 11:
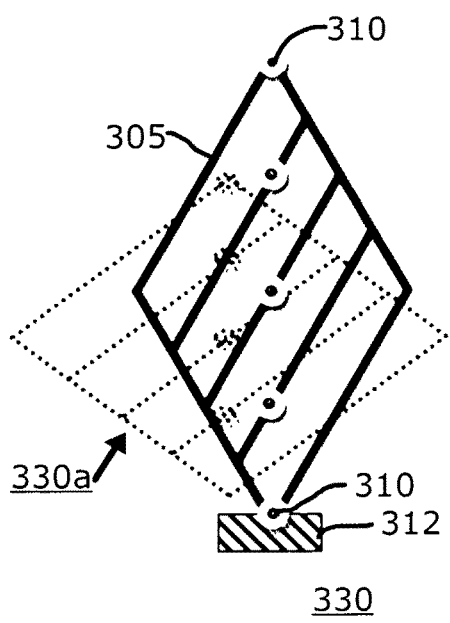
FIG. 11 is a simplified schematic representation of a further parallel linkage embodiment of the invention.

FIG. 11 is a simplified schematic representation of a further parallel linkage embodiment of the invention in the form of a parallel linkage arrangement 330 that has compliant legs coupled to one another at compliant nodes, as previously described. Elements of structure that bear analogous correspondence to ones previously discussed are similarly designated. Parallel linkage arrangement 330 is deformable by the application of an actuation force (not shown in this figure) whereby it assumes the configuration represented by 330a.

Figure 12:
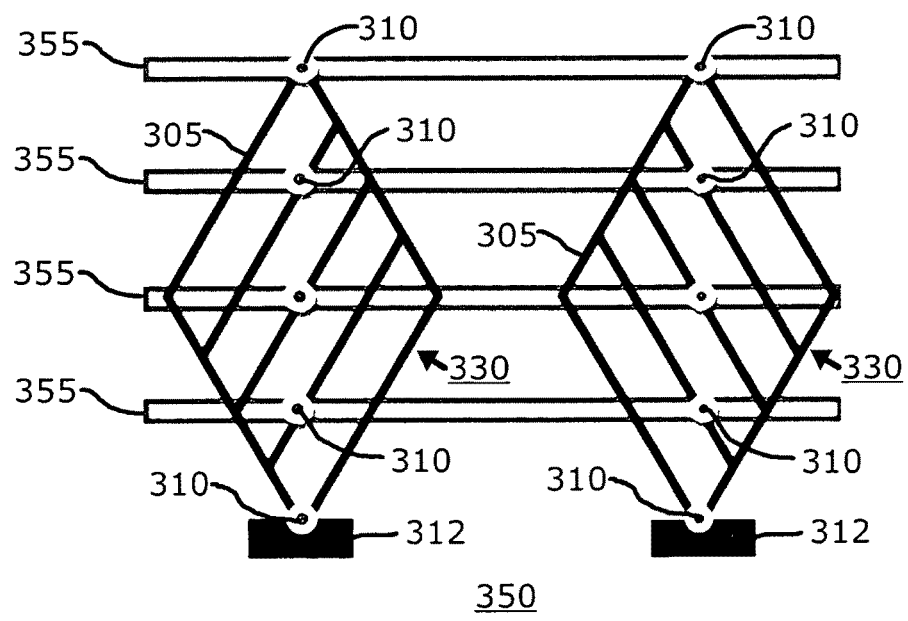
FIG. 12 is a simplified schematic representation of an embodiment of the invention that utilizes two parallel linkage embodiments of the type represented in FIG. 11, arranged in mirror relation to one another.

FIG. 12 is a simplified schematic representation of an embodiment of the invention 350 that utilizes two parallel linkage arrangements 330 of the type represented in FIG. 11, arranged in mirror relation to one another. Elements of structure that have previously been discussed are similarly designated. In this embodiment of the invention, couplers 310 are coupled to loads in the form of load bars 355. It is a significant characteristic of this embodiment of the invention that as parallel linkage arrangements 330 are subjected to an actuation force (not shown in this figure), the distance between load bars 355 is varied, but the load bars remain parallel with respect to each other. Of course, other forms of motion, including non-parallel motion, or non-equidistant motion, can be achieved in response to appropriate selection of the resilience characteristics of compliant legs 305, and the distribution of leg thickness parameter therealong, as described hereinabove in connection with FIG. 7.

Figure 13:
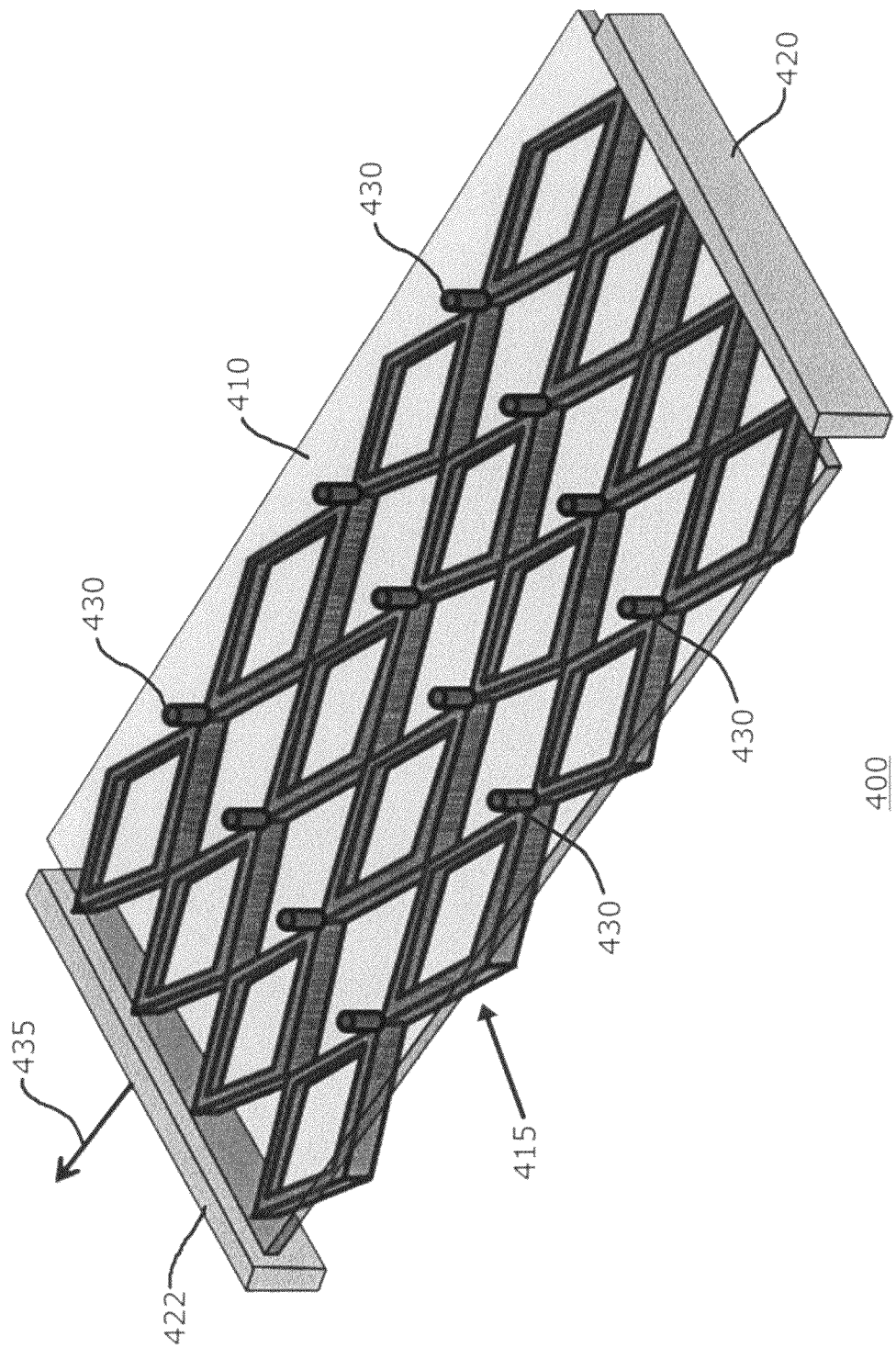
FIG. 13 is a simplified schematic representation of a motion distribution system constructed in accordance with the principles of the invention to stretch an elastic membrane uniformly.

FIG. 13 is a simplified schematic representation of a motion distribution system 400 constructed in accordance with the principles of the invention to stretch an elastic membrane 410 uniformly. In this embodiment, an array 415 of compliant elements of the type hereinabove described are constrained by constraints 420 and 422. Certain ones of the compliant nodes are provided with couplers 430 that in some embodiments of the invention are coupled to elastic membrane 410. The elastic membrane is shown in this embodiment of the invention to overlie array 415. Upon the application of an actuating force (not shown in this figure), constraint 422 is urged in the direction of arrow 435.

In some embodiments of the invention, the elastic membrane is formed of a compliant material. The compliant material is, in some embodiments, a compliant fabric. In addition, the practice of the invention is not limited to a substantially planar array, as shown in FIG. 13, but can, in some embodiments, be configured to be stretched over a three-dimensional contour. The characteristics of the three-dimensional contour can be determined in response to a correspondingly contoured base element (not shown), or can be determined by appropriate selection of the dimensional characteristics of the resilient legs, as well as their respective resilience characteristics. In still further embodiments, a desired contour for the membrane can be achieved by employing plural arrays coupled to one another and arranges at respective orientations relative to one another, such arrays having respectively associated force response characteristics.

Although the invention has been described in terms of specific embodiments and applications, persons skilled in the art may, in light of this teaching, generate additional embodiments without exceeding the scope or departing from the spirit of the invention claimed herein. Accordingly, it is to be understood that the drawing and description in this disclosure are proffered to facilitate comprehension of the invention, and should not be construed to limit the scope thereof.

What is claimed is:

1. A force distribution arrangement, comprising a compliant building block having a plurality of resilient leg elements having respective leg thickness distribution and leg length, and a corresponding plurality of compliant nodes where the leg elements are joined to one another.

2. The force distribution arrangement of claim 1, wherein the resilient leg elements and the compliant nodes are integrally formed.

3. The force distribution arrangement of claim 1, wherein there are provided a plurality of compliant building blocks coupled to each other to form an array.

4. The force distribution arrangement of claim 3, wherein the array of compliant building blocks is integrally formed.

5. The force distribution arrangement of claim 3, wherein the array is constrained at a first end thereof.

6. The force distribution arrangement of claim 5, wherein the array is constrained at a second end thereof.

7. The force distribution arrangement of claim 6, wherein there is further provided a membrane arranged to overlie the array.

8. The force distribution arrangement of claim 3, wherein there is further provided a control point affixed to the array.

9. The force distribution arrangement of claim 8, wherein the control point is coupled to a membrane that is arranged to overlie the array.

10. The force distribution arrangement of claim 9, wherein the membrane is formed of a compliant material.

11. The force distribution arrangement of claim 9, wherein the membrane is formed of a compliant fabric.

12. The force distribution arrangement of claim 3 wherein there is further provided a further array arranged at a predetermined orientation with respect to the array.

13. The force distribution arrangement of claim 12, wherein the array and the further array have respective actuation force response characteristics.

14. The force distribution arrangement of claim 1, wherein the plurality of resilient leg elements are of uniform thickness.

15. The force distribution arrangement of claim 1, wherein the plurality of resilient leg elements are of uniform length.

16. The force distribution arrangement of claim 1, wherein the plurality of resilient leg elements have variations in thickness and contours.

17. The force distribution arrangement of claim 1, wherein the plurality of resilient leg elements have variations in length.

* * * * *